(12) United States Patent
Braun et al.

(10) Patent No.: US 10,984,518 B2
(45) Date of Patent: Apr. 20, 2021

(54) METHODS AND SYSTEMS FOR ASSESSING THE QUALITY OF GEOSPATIAL DATA

(71) Applicant: Continental Mapping Consultants, LLC, Sun Prairie, WI (US)

(72) Inventors: Paul Braun, Middleton, WI (US); Daniel Frye, New Glarus, WI (US); David Hart, Sun Prairie, WI (US)

(73) Assignee: Continental Mapping Consultants, LLC, Sun Prairie, WI (US)

( * ) Notice: Subject to any disclaimer, the term of this patent is extended or adjusted under 35 U.S.C. 154(b) by 120 days.

(21) Appl. No.: 16/422,636

(22) Filed: May 24, 2019

(65) Prior Publication Data

US 2020/0372624 A1 Nov. 26, 2020

(51) Int. Cl.
*G06T 7/00* (2017.01)
*G06T 7/11* (2017.01)
*G06K 9/00* (2006.01)

(52) U.S. Cl.
CPC ........ *G06T 7/0002* (2013.01); *G06K 9/00476* (2013.01); *G06T 7/11* (2017.01); *G06T 2207/20021* (2013.01); *G06T 2207/30168* (2013.01)

(58) Field of Classification Search
CPC ............... G06T 7/0002; G06T 7/11; G06T 2207/20021; G06T 2207/30168; G06K 9/00476
See application file for complete search history.

(56) References Cited

U.S. PATENT DOCUMENTS

| | | | |
|---|---|---|---|
| 8,484,199 B1 * | 7/2013 | Katragadda | G06F 16/29 707/723 |
| 10,349,208 B1 * | 7/2019 | Liang | G06F 16/29 |
| 2007/0297683 A1 * | 12/2007 | Luo | G06K 9/00664 382/224 |
| 2016/0019419 A1 * | 1/2016 | Chen | G06K 9/00476 382/113 |
| 2016/0239709 A1 * | 8/2016 | Shriver | G06K 9/00657 |
| 2017/0127233 A1 * | 5/2017 | Liang | H04L 67/22 |
| 2019/0007793 A1 * | 1/2019 | Liang | H04W 4/021 |
| 2019/0045331 A1 * | 2/2019 | Liang | H04W 4/029 |
| 2019/0320285 A1 * | 10/2019 | Liang | G06N 20/00 |
| 2020/0082561 A1 * | 3/2020 | Karonchyk | G01C 21/30 |
| 2020/0155881 A1 * | 5/2020 | Tohidi | G06N 20/00 |
| 2020/0155882 A1 * | 5/2020 | Tohidi | G06F 16/587 |
| 2020/0159397 A1 * | 5/2020 | Tohidi | G08B 17/005 |
| 2020/0372072 A1 * | 11/2020 | Braun | G06F 17/18 |
| 2020/0372624 A1 * | 11/2020 | Braun | G06T 7/0002 |

* cited by examiner

*Primary Examiner* — Aaron W Carter
(74) *Attorney, Agent, or Firm* — Morrison & Foerster LLP

(57) ABSTRACT

Methods and systems for evaluating the quality of a geospatial data set are provided. Regions of a data set may be selected for review based on statistical methods and a distribution of map features in the data set. Based on errors identified in the selected regions, one or more quality scores may be generated for the data set. Quality scores may be applied toward assessing the utility of the data set against an intended use. Quality scores may be modified in response to an indication that certain feature classes are not relevant for an intended use of the data set. Information associated with the review of a data set may be tracked and stored.

26 Claims, 10 Drawing Sheets

600

- ☐ Points_COUNTS
- 602 ☐ Lines_COUNTS
- ☐ Polygons_COUNTS
- ☑ Total_COUNTS — 604
- ☐ Points_UNIQUE_FEATURE
- ☐ Lines_UNIQUE_FEATURE
- ☐ Polygons_UNIQUE_FEATURE
- ☐ Total_UNIQUE_FEATURE
- ☑ Total_LENGTH
- ☑ Total_AREA
- ☐ ??_COUNTS

CALCULATE

FIG. 6

METHODS AND SYSTEMS FOR ASSESSING THE QUALITY OF GEOSPATIAL DATA

FIELD OF THE INVENTION

This invention relates generally to geospatial data assessment. More specifically, it relates to determining the quality of geospatial data depending on an intended use of the data.

BACKGROUND OF THE INVENTION

Geospatial data is typically generated by identifying features in images captured by aerial sensors, such as cameras in satellites, airplanes, helicopters, unmanned aerial system, or other aerial platforms. Photogrammetrists or spatial analysts typically view these images and identify desired features. A cartographer or photogrammetrist may identify a feature in an overhead image, such as a building, road, river, or lake, and create a corresponding feature in a geospatial data set, which may be used to produce a map. Geospatial data sets are often generated using a software based tool. Several types of errors may arise when geospatial data is generated. For example, features in an image may be overlooked and are not placed in the geospatial data set (omission), or features may be erroneously included in the data set when no such feature exists in the real world (commission). Additionally, features placed in the geospatial data set may be subject to other types of error. A feature may be properly identified but placed at the wrong location in the geospatial data set (positional accuracy), or a feature may be properly identified and placed in the geospatial data set, but may be characterized incorrectly. For example, a feature may be characterized based on an incorrect theme (e.g. a road is incorrectly characterized as a river), or a feature may be characterized as having an incorrect attribute (e.g. a feature may be properly identified as a building, but the mapmaker may incorrectly classify the building as a school instead of a church).

The quality of a geospatial data set—that is, the quantity and type of errors in the data set—is typically important to map makers and map consumers. However, currently no method exists for accurately and objectively characterizing the quality of a geospatial data set.

SUMMARY OF THE INVENTION

As explained above, there is a need for a method of accurately and objectively characterizing the quality of a geospatial data set. Currently, geospatial data quality is typically determined by a reviewer receiving a data set and looking for errors. If the reviewer finds a certain number of errors, the data set may be rejected. Several problems arise with current methods. For example, a reviewer may be inherently biased or a reviewer may not take into account the intended purpose of the data when performing a review. For example, a data set that has many errors associated with fire hydrants may nonetheless be suitable for a delivery truck driver who only cares about roads. Under existing methods, a geospatial data set may be rejected based on errors that are not relevant to an intended use of the data.

Current methods also result in inefficient review and inconsistent results. Data sets are often too large for a reviewer to review every feature for accuracy. Current methods do not provide guidance as to how much of a data set should be reviewed in order to accurately characterize the data set as a whole and do not provide guidance to reviewers as how to organize their review. Thus, different reviewers may prioritize their review in different ways, leading to different conclusions about the quality of the data set and causing reviewers to waste time reviewing unnecessary amounts of data. For example, one reviewer may focus on urban areas that include a higher density of features and possible errors. Another reviewer may review a dataset based on high interest feature classes (e.g., roads or rivers) and arrive at a different conclusion about the quality of the data set.

These problems may be addressed by the systems and methods described herein for configuring and operating a geospatial data assessment system for quantifying the quality of a geospatial data set. The systems and methods described herein allow for consistent and accurate assessment of a geospatial data by identifying a subset of the data for review, generating statistically valid and repeatable quality measurements, and providing tools for comparison of the measurements against intended uses of the data set. The systems and methods allow a user to review significantly less data while still accurately estimating the overall error rate of a geospatial data set.

In one or more embodiments, regions of a data set may be selected for review based on statistical methods and the distribution of map features in the data set. Based on errors identified in the selected regions, the systems and methods may generate quality scores for the data set as a whole based on the number of identified errors associated with each feature class or groups of feature classes that may be applied toward assessing the utility of the data set against an intended use. The quality scores may correspond to an error rate within a confidence interval.

Based on the quality scores, the system may indicate whether a data set is suitable for one or more intended uses or indicating that the data set requires correction, such as by comparing the scores to one or more threshold values. A user may similarly determine, based on the generated scores, whether a data set is suitable for one or more intended uses or whether the data set requires improvement. Additionally, the system may indicate how one or more feature classes affect quality scores. A user may modify quality scores by indicating that certain feature classes are not relevant for an intended use of the data set. In response to an indication that a feature class is not relevant, quality scores may be updated. A user may compare the quality scores of one data set with the scores of another data set.

The systems and methods described herein may increase the efficiency of review by reducing the amount of data a reviewer must review in order to accurately characterize the data set as a whole. The systems and methods also provide for tracking the lineage of a data set. Information regarding the data set, the reviewer, and the review process, such as identified and/or corrected errors, may be stored for later reference by a consumer of the geospatial data.

In some embodiments, a method for identifying geospatial data for quality review is provided, the method comprising: receiving a geospatial data set representing a geographic area, wherein the geospatial data set comprises data representing a plurality of map features, and wherein the plurality of map features is associated with one or more feature classes; determining a value for map features in the geospatial data set; and selecting one or more regions in the geospatial data set for review, wherein selecting one or more regions in the geospatial data set for review comprises: dividing the geospatial data set into a plurality of regions; determining a value for map features in each region; determining a probability score for each region based on the value for map features in the region and the value for features in the geospatial data set; and selecting one or more regions for review based on the probability scores, wherein a number of selected regions is based on a value for map features in the one or more selected regions reaching a threshold value.

In some embodiments, the method comprises identifying one or more feature class categories, wherein a feature class category comprises one or more feature classes of interest.

In some embodiments, the method comprises outputting one or more review areas, wherein the one or more review areas comprise data representing the selected regions.

In some embodiments, the method comprises evaluating the one or more review areas, wherein evaluating the one or more review areas comprises identifying one or more errors in the selected regions.

In some embodiments, evaluating the one or more review areas comprises storing error information associated with an identified error.

In some embodiments, error information comprises a feature class of the identified error.

In some embodiments, error information comprises a description of the identified error.

In some embodiments, error information comprises a location of the identified error.

In some embodiments, evaluating the one or more review areas comprises storing evaluation information associated with an evaluation.

In some embodiments, evaluation information comprises an identity of a reviewer.

In some embodiments, evaluation information comprises an amount time spent reviewing the data for review.

In some embodiments, evaluation information comprises an amount of time spent reviewing a selected region.

In some embodiments, the method comprises receiving one or more evaluated review areas, wherein the one or more evaluated review areas comprise one or more identified errors in the selected regions.

In some embodiments, the method comprises determining a quality score based on the reviewed data.

In some embodiments, the method comprises receiving a target quality score.

In some embodiments, the method comprises: in accordance with a determination that the quality score is greater than or equal to the target quality score, indicating that the quality score is greater than or equal to the target quality score; and in accordance with a determination that the quality score is less than the target quality score; indicating that the quality score is less than the target quality score.

In some embodiments, the method comprises determining a quality score for the one or more feature class categories.

In some embodiments, determining a probability score for a region comprises determining a z-score of the region based on the value for map features in each region.

In some embodiments, selecting one or more regions for review based on the probability scores is based on a weighted random selection, wherein the weighted random selection is based on the probability scores of the regions.

In some embodiments, determining a quality score is based on a value for map features in the one or more selected regions, the value for map features in the geospatial data set, and a quantity of errors associated with one or more map features in the selected regions.

In some embodiments, outputting one or more review areas comprises generating a second data set, wherein the second data set comprises data corresponding to the one or more selected regions.

In some embodiments, the method is at an electronic device.

In some embodiments, a system an electronic system is provided, the system comprising one or more processors; one or more memories; and one or more programs, wherein the one or more programs are stored in the one or more memories and configured to be executed by the one or more processors, the one or more programs including instructions for: receiving a geospatial data set representing a geographic area, wherein the geospatial data set comprises data representing a plurality of map features, and wherein the plurality of map features is associated with one or more feature classes; determining a value for map features in the geospatial data set; and selecting one or more regions in the geospatial data set for review, wherein selecting one or more regions in the geospatial data set for review comprises: dividing the geospatial data set into a plurality of regions; determining a value for map features in each region; determining a probability score for each region based on the value for map features in the region and the value for map features in the geospatial data set; and selecting one or more regions for review based on the probability scores, wherein a number of selected regions is based on a value for map features in the one or more selected regions reaching a threshold value.

In some embodiments, a user provides the geospatial data set from a client computer.

In some embodiments, the system is located remotely from the client computer.

In some embodiments, a non-transitory computer readable storage medium storing one or more programs is provided, the one or more programs comprising instructions, which when executed by an electronic system, cause the system to: receive a geospatial data set representing a geographic area, wherein the geospatial data set comprises data representing a plurality of map features, and wherein the plurality of map features is associated with one or more feature classes; determine a value for map features in the geospatial data set; and select one or more regions in the geospatial data set for review, wherein selecting one or more regions in the geospatial data set for review comprises: dividing the geospatial data set into a plurality of regions; determining a value for map features in each region; determining a probability score for each region based on the value for map features in the region and the value for map features in the geospatial data set; and selecting one or more regions for review based on the probability scores, wherein a number of selected regions is based on a value for map features in the one or more selected regions reaching a threshold value.

BRIEF DESCRIPTION OF THE DRAWINGS

FIG. 6 shows a sampling parameter selection interface, according to some embodiments.

DETAILED DESCRIPTION OF THE INVENTION

Described herein are systems and methods for determining the quality of a geospatial data set. The systems and methods described herein allow for the determination of accurate, objective, and consistent measures of the quality of a geospatial data set by using statistical methods to select regions of the data set for review and quantifying the quality of the data set as a whole based on a review of the selected regions. The systems and methods may generate one or more quality scores based on the data set as a whole and/or based on one or more feature classes that may be applied toward assessing the utility of the data set against one or more intended uses of the data set. The quality scores may correspond to an error rate within a confidence interval.

In some embodiments, the system may receive a first geospatial data set corresponding to a geographic area. The system may select regions of the data set for quality review—"review areas"—based on the distribution of map features within the data set. The system may generate a second data set for evaluation based on the selected regions.

After the second data set has been reviewed for errors, the system may receive the second data set and determine quality scores for the first data set based on errors identified in the selected regions.

Figure 1:
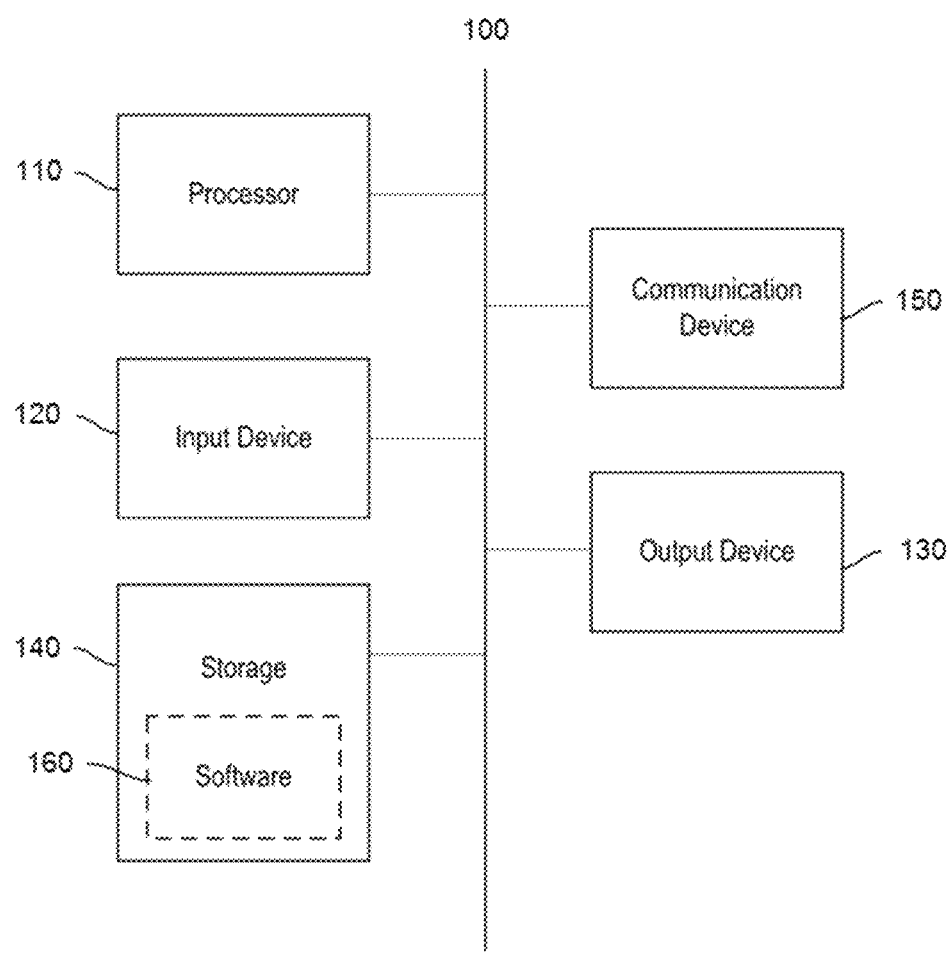
FIG. 1 illustrates an example of a geospatial data quality assessment system, according to some embodiments.

FIG. 1 illustrates an example of a geospatial data quality assessment system 100, in accordance with one embodiment. In some embodiments, system 100 is configured to execute a method of determining the quality of a geospatial data set, such as described with respect to method 200 of FIG. 2, below.

In some embodiments, system 100 can be any suitable type of microprocessor-based device, such as a personal computer, workstation, server, videogame console, or handheld computing device, such as a phone or tablet. The system can include, for example, one or more of processor 110, input device 120, output device 130, storage 140, and communication device 150. Input device 120 and output device 130 can generally correspond to those described above and can either be connectable or integrated with the computer.

In some embodiments, system 100 can be a computer. System 100 can be a local computer or a cloud computing platform. System 100 can include multiple computers. Computers composing system 100 may be co-located or may be located in different locations. System 100 can be a host computer connected to a network. In other embodiments, system 100 can be a client computer or a server.

Input device 120 can be any suitable device that provides input, such as a touch screen or monitor, keyboard, mouse, or voice-recognition device. Output device 130 can be any suitable device that provides output, such as a touch screen, monitor, printer, disk drive, or speaker.

Storage 140 can be any suitable device that provides storage, such as an electrical, magnetic, or optical memory, including a RAM, cache, hard drive, CD-ROM drive, tape drive, or removable storage disk.

Communication device 150 can include any suitable device capable of transmitting and receiving signals over a network, such as a network interface chip or card. The components of the computer can be connected in any suitable manner, such as via a physical bus or wirelessly.

Storage 140 can be a non-transitory computer-readable storage medium comprising one or more programs, which, when executed by one or more processors, such as processor 110, cause the one or more processors to execute methods described herein.

Software 160, which can be stored in storage 140 and executed by processor 110, can include, for example, the programming that embodies the functionality of the present disclosure (e.g., as embodied in the systems, computers, servers, and/or devices as described above). In some embodiments, software 160 can be implemented and executed on a combination of servers such as application servers and database servers.

Software 160, or part thereof, can also be stored and/or transported within any computer-readable storage medium for use by or in connection with an instruction execution system, apparatus, or device, such as those described above, that can fetch and execute instructions associated with the software from the instruction execution system, apparatus, or device. In the context of this disclosure, a computer-readable storage medium can be any medium, such as storage 140, that can contain or store programming for use by or in connection with an instruction execution system, apparatus, or device.

Software 160 can also be propagated within any transport medium for use by or in connection with an instruction execution system, apparatus, or device, such as those described above, that can fetch and execute instructions associated with the software from the instruction execution system, apparatus, or device. In the context of this disclosure, a transport medium can be any medium that can communicate, propagate, or transport programming for use by or in connection with an instruction execution system, apparatus, or device. The transport-readable medium can include, but is not limited to, an electronic, magnetic, optical, electromagnetic, or infrared wired or wireless propagation medium.

System 100 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

System 100 can implement any operating system suitable for operating on the network. Software 160 can be written in any suitable programming language, such as C, C++, Java, or Python. In various embodiments, application software embodying the functionality of the present disclosure can be deployed in different configurations, such as in a client/server arrangement or through a Web browser as a Web-based application or Web service, for example.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic, or optical signals capable of being stored, transferred, combined, compared, and otherwise manipulated. It is convenient at times, principally for reasons of common usage, to refer to these signals as bits, values, elements, symbols, characters, terms, numbers, or the like. Furthermore, it is also convenient at times to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that, throughout the description, discussions utilizing terms such as "processing," "computing," "calculating," "determining," "displaying," "obtaining," or the like, refer to the action and processes of a computer system, or similar electronic computing device, that manipulates and transforms data represented as physical (electronic) quantities within the computer system memories or registers or other such information storage, transmission, or display devices.

Certain aspects of the geospatial data quality assessment system include process steps and instructions described herein in the form of an algorithm. It should be noted that the process steps and instructions of the system could be embodied in software, firmware, or hardware and, when embodied in software, could be downloaded to reside on and be operated from different platforms used by a variety of operating systems.

The system also relates to a device for performing the operations herein. This device may be specially constructed for the required purposes, or it may comprise a general-purpose computer selectively activated or reconfigured by a computer program stored in the computer. Such a computer program may be stored in a non-transitory, computer-readable storage medium, such as, but not limited to, any type of disk, including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The methods, devices, and systems described herein are not inherently related to any particular computer or other apparatus. Various general-purpose systems may also be used with programs in accordance with the teachings herein, or it may prove convenient to construct a more specialized apparatus to perform the required method steps. The required structure for a variety of these systems will appear from the description below. In addition, the geospatial data quality assessment system is not described with reference to any particular programming language. It will be appreciated that a variety of programming languages may be used to implement the teachings of the system as described herein.

Figure 2:
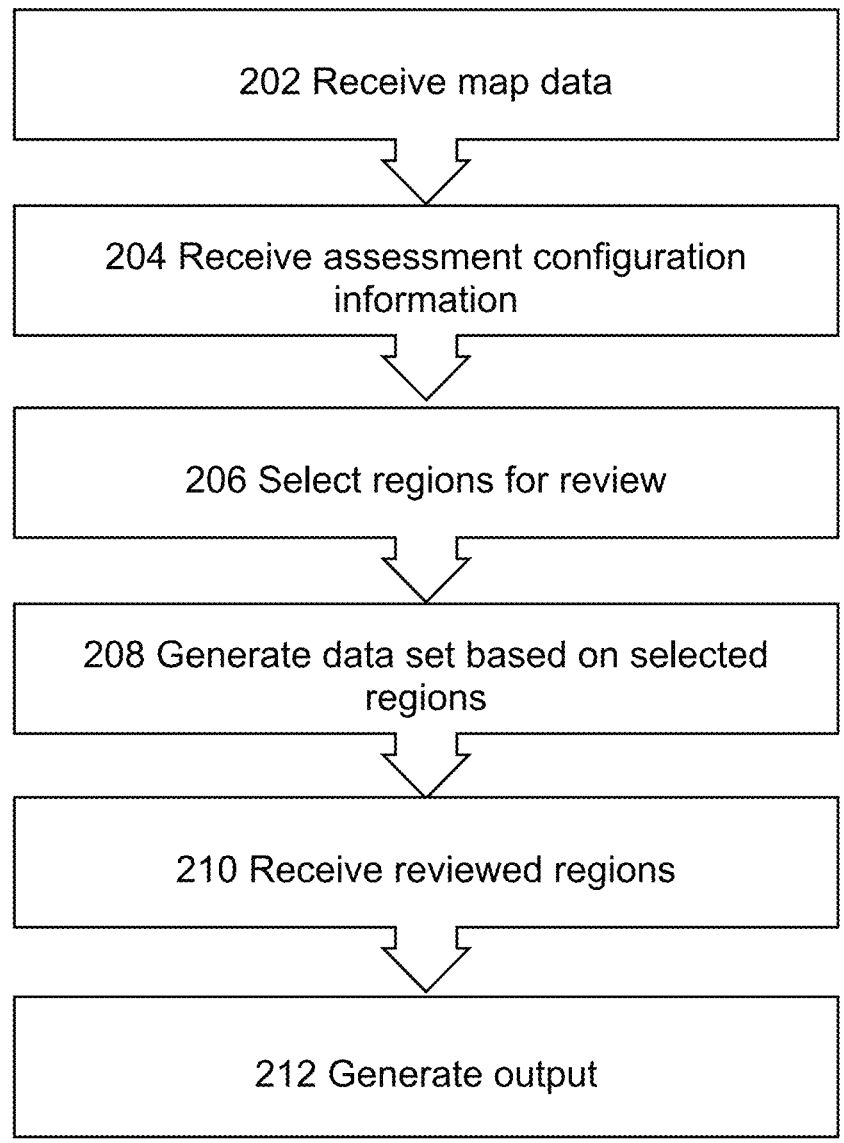
FIG. 2 illustrates a method for determining the quality of a geospatial data set, according to some embodiments.

FIG. 2 illustrates a method 200 for determining the quality of a geospatial data set, according to some embodiments. Method 200 may be performed at a geospatial data quality assessment system, such as system 100 described with respect to FIG. 1, above.

The method provides for receiving a first geospatial data set, such as from a user, receiving assessment configuration information, and selecting one or more regions for review, where each region comprises a subset of the data set. A second data set may be generated based on the selected regions that defines review areas and includes error calls generated by a user.

The selected regions may be reviewed, such as by a user, by identifying errors in the selected regions. One or more error calls may be generated and stored in the second data set that correspond to errors identified during review. After review, the reviewed data set may be received, and quality scores may be determined for the first data set based on errors identified during review and stored in the second data set. An output may be generated based on the first data set, the second data set, errors identified during review, and/or quality scores. Based on the quality scores, a determination may be made whether the first data set is suitable for one or more intended uses and/or whether the data set requires additional corrections, such as by comparing one or more quality scores to one or more target quality scores. Similarly, a user may determine, based on the quality scores whether the first data set is suitable for one or more intended uses and/or whether the data set requires additional corrections.

At step 202 a geospatial data set may be received, such as by a geospatial data quality assessment system, that comprises geospatial data to be evaluated. In some embodiments, the geospatial data set may be stored and analyzed locally. In other embodiments, the data set may be transmitted to another system, such as a remote server or the cloud, to be analyzed.

In some embodiments, a geospatial data set may be stored as a database, such as an ArcGIS geodatabase, or other data structure suitable for storing geospatial data. A geospatial data set may include a plurality of map features, such as roads, rivers, buildings, signs, powerlines, fire hydrants, or any other feature that may be identified based on a geographic position. A geospatial data set may store geographic position information associated with each feature. In this way, a geospatial data set may function as a digital map.

Map features may be grouped based on different characteristics. Information indicating how features are categorized may be stored in the geospatial data set, such as in the schema of a database.

Features may be grouped based on geometric characteristics, such as points, lines, polygon, or other geometry. Each geometric category may be referred to as a "layer." For example, small objects, such as stop signs or fire hydrants, may be categorized as points. Other objects, such as roads or rivers, may be characterized as lines having a length. Large objects, such as buildings or lakes, may be characterized as polygons having an area.

Features, such as a river, stream, and/or creek, may also be grouped by feature class, such as "rivers." Features may also be grouped by "theme." For example, rivers and lakes may be grouped into a single them, such as "surface water." Thus, two objects, such as a river and a road may be grouped in the same geometric or layer category, but may be grouped into different feature classes and/or themes.

Features may also be grouped based on more specific characteristics, or "attributes," such as schools, churches, grocery stores, post offices, etc. Thus, two objects—for example, a church and a school—may be grouped in the same feature class—buildings—but may be grouped into different attributes.

Figure 3:
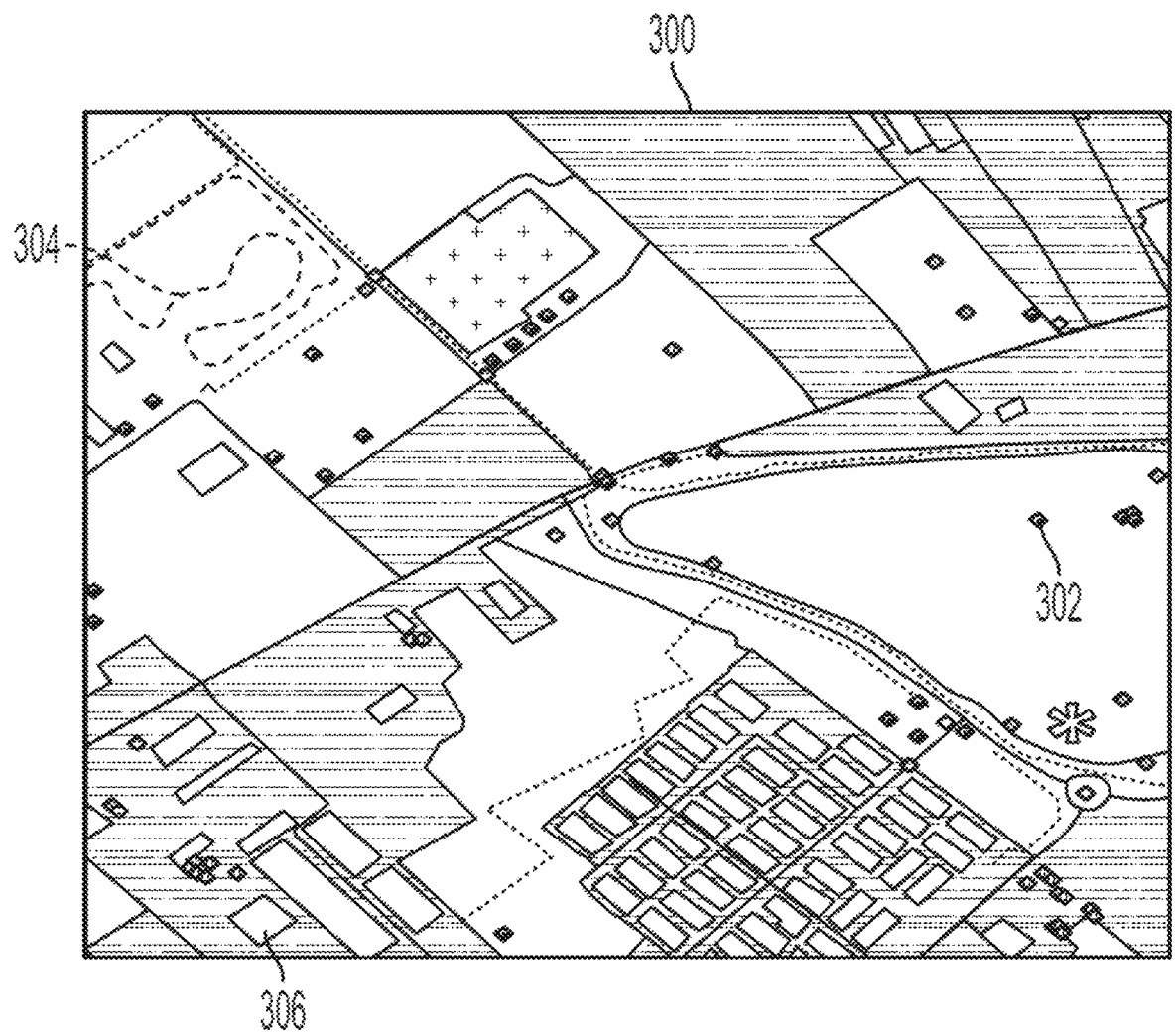
FIG. 3 shows a visual representation of a geospatial data set, according to some embodiments.

FIG. 3 shows a visual representation of a geospatial data set, according to some embodiments. FIG. 3 includes a map 300 and a plurality of features. For example, map 300 includes point feature 302, linear feature 304, and polygon feature 306. Map 300 may correspond to a geographic area.

A geospatial data set may be generated by identifying features in an image and creating a correspond feature in the data set. For example, a user may identify a river in an aerial image and create a line in a geospatial data set that corresponds to the river. The line and associated information, such as length, description, name, geographic location, or other information, may be stored as a feature in a geospatial data set. A geospatial data set may be generated by a human or a machine, such as by using a machine learning classifier.

A geospatial data set may be generated based on any type of suitable image. For example, a geospatial data set may be generated based on an image, such as captured by a camera or other sensor, which may be mounted on a drone, satellite, aircraft, vehicle, stationary structures, or other location.

At step 204, assessment configuration information may be determined. Configuration information may correspond to one or more feature classes, use cases, and/or error types on which quality scores may be based. Configuration information may include relative importance of different feature classes to the quality of the data set. One or more feature classes in the geospatial data set may be associated with a level of relevance to one or more intended uses of the data set, such as essential (highest), important, or referential (lowest). Thus, by categorizing feature classes by relevance to an intended use, generated scores may be applied toward assessing the utility of the data set against an intended use. Configuration information may also include different types of error, such as omission, commission, or other types of error. Based on the error type configuration information, the system may determine quality scores based on selected error types. Configuration information may be determined based on an input from a user, based on a default selection, or based on a stored data file.

Configuration information may also include one or more target quality scores. Configuration information may include a target quality score for the data set as a whole, or one or more target quality scores for one or more categories of feature classes.

The assignment of feature classes to different categories and selection of target quality scores may establish a standard against which a data set can be measured to assess utility for an intended use. For example, a first user may assign feature classes to categories and select a first set of target quality scores as a standard against which to assess utility of a data set for a first intended use. A second user may assign feature classes to the same categories as the first user, but may assign different quality scores to each category as a standard against which to assess utility of a data set for a second intended use, distinct from the first intended use.

Categorizing feature classes by level of relevance and setting target quality scores may increase quality assessment consistency between different users and within organizations. For example, two reviewers assessing the quality of the same data set for an intended use, such as evacuation, may subjectively prioritize the respective importance of different feature classes to the intended use. However, by standardizing categories of importance and target quality scores between reviewers, different reviewers are more likely to reach consistent conclusions regarding the fitness of a data set for an intended use. Additionally, categorization of feature classes by relevance to an intended use may increase consistency of quality assessment within an organization by ensuring that the same feature class categories and target quality scores are used each time a data set is evaluated for an intended purpose. In some embodiments, the system may enable a user to configuration settings for future use. Saved configuration settings may be reused repeatedly for the same data set or may be used to assess different data sets for the same intended use.

Figure 4:
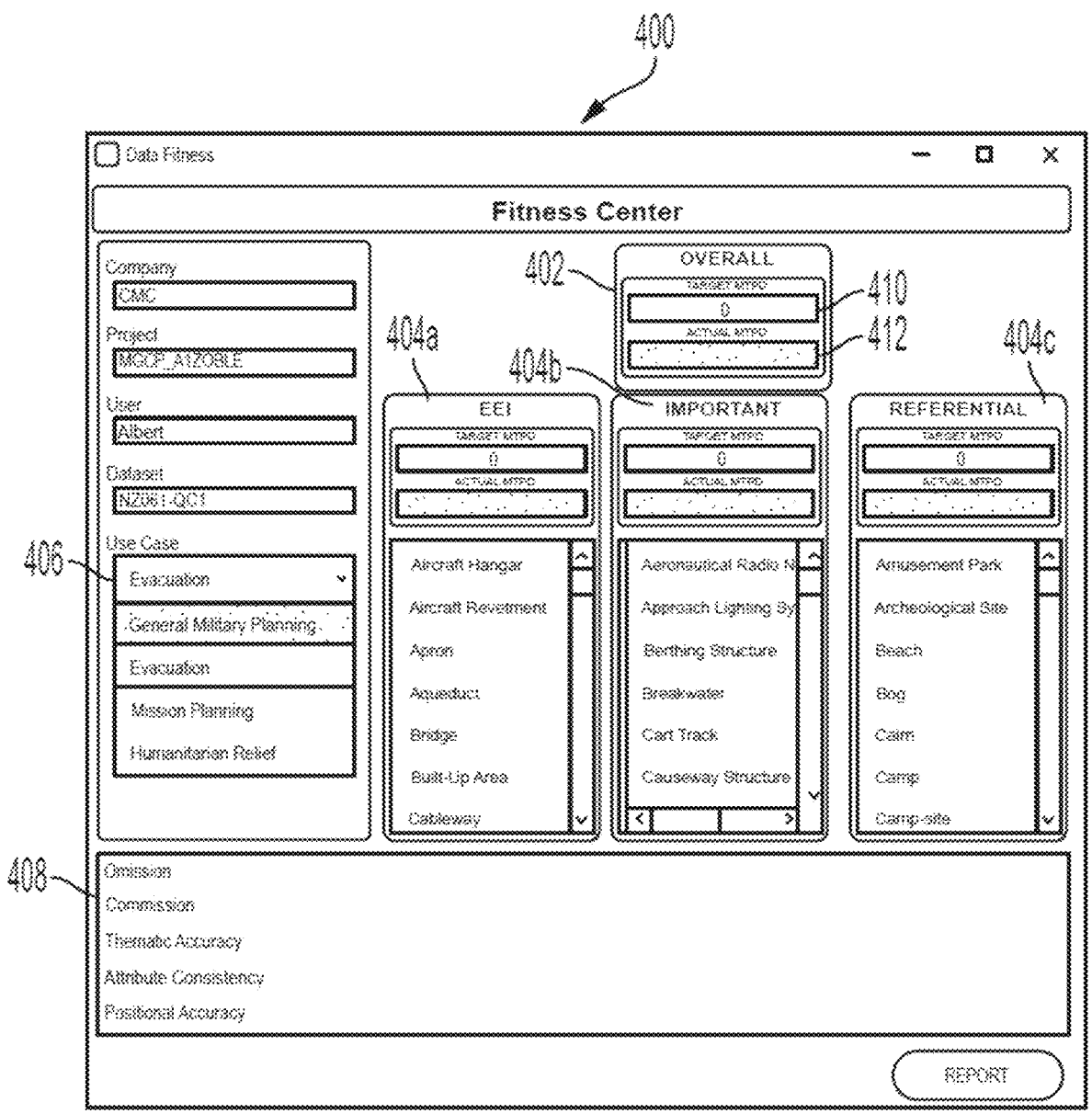
FIG. 4 shows an assessment configuration interface, according to some embodiments.

FIG. 4 shows an assessment configuration interface 400, according to some embodiments. The interface may include one or more quality score fields 402, one or more feature class categories 404a-404c, a use case field 406, and an error type field 408.

A quality score field 402 may include a target score field 410 and an actual score field 412. Target score field 410 may be an input, such as a text field, that allows a user to enter a target quality score. A target quality score may correspond to a maximum error rate for which a data set is determined to be suitable for use for an intended purpose. Actual score 412 may be an output that displays a computed quality score after a data set has been analyzed. In some embodiments, the interface may include a qualify score field corresponding to the data set as a whole. The interface may include additional quality score fields corresponding to feature class categories, feature geometries, feature attributes, and/or other subsets of features.

In other embodiments, target scores may be selected for one or more feature classes and/or one or more use cases. Similarly, in some embodiments, an actual score may be displayed corresponding to the data set as a whole. In other embodiments, a plurality of actual scores may be displayed corresponding to quality scores associated one or more feature classes, one or more use cases, one or more sampling parameters, and/or other subset of features.

Feature class categories 404a-404c may be input fields that allow a user to group one or more feature classes. A feature class category may include one or more feature classes. The system may determine quality scores based on one or more feature class categories. The interface may include a quality score field associated with one or more feature class categories. In some embodiments, the interface may include a quality score field for each feature class category.

The example of FIG. 4 includes three feature class categories—essential, important, and referential. However, in other embodiments, there may be more or less feature class categories.

Feature class categories may be populated based on feature classes that exist in the data set to be evaluated, for example, within the schema of a database. When the interface is first displayed, all feature classes may be associated with a single feature class category. A user may move a feature class between categories, such as by selecting a feature class and dragging the feature class from a first category to a second category.

Use case field 406 may be an input, such as radio buttons, check boxes, drop-down menu, or other input field, that allows a user to select a use case for which a data set may be evaluated. Each use case may correspond to a predetermined selection of feature class categories for one or more feature classes and/or a selection of one or more target quality scores. For example, in response to a selection of a humanitarian relief use case, feature classes essential to humanitarian relief may be automatically associated with the essential category, feature classes important to humanitarian relief may be automatically associated with the important category, and feature classes unimportant to humanitarian relief may be automatically associated with the referential category. Additionally, target quality scores may be automatically selected.

In some embodiments, a use case may correspond to a data file stored in a library of use case files that includes information associating one or more feature classes with one or more feature class categories. A use case file may also include one or more target quality scores. For example, a use case file may include an overall target quality score and/or a target quality score for each feature class category defined in the use case file. A use case file library may be used by multiple users to increase consistency of quality assessment between users. A user may modify and save an existing use case file or create a new use case file and store the new use case file in a library, which may be accessed and used by other users.

The interface may allow a user to store configuration information to generate a new use case. For example, the interface may allow a user to store information based one or more target scores entered by a user and/or information indicating to which category one or more feature classes is assigned. The interface may store configuration information as an entry in a database, as a data file, or as other data structure. Stored configuration information may be stored in a library of use cases. Stored configuration information may be used at a later time, such as by selecting the configuration information via use case field 406, to automatically populate one or more target scores and/or feature class categories. Stored configuration information may also be shared between users in the same organization or in separate organizations to increase consistency of quality assessment between users.

Error type field 408 may be an input, such as radio buttons, check boxes, or other input, that allows a user to indicate on which error types the quality scores should be based. In some embodiments, all error types may be selected by default.

Returning to the method of FIG. 2, at step 206, one or more subsets of the geospatial data set may be selected for review. In some embodiments, the subsets may correspond to geographic regions represented by the geospatial data set. The selected regions may include a statistically representative subset features in the data set. In some embodiments, the number of regions selected may correspond to a minimum number of regions necessary to include an amount of features necessary for the selected regions to be statistically representative of the whole data set.

In some embodiments, the regions may be of equal size. In other embodiments, one or more regions may be of a different size than one or more other regions. In some embodiments, one or more regions may overlap with one or more other regions. In other embodiments, none of the regions may overlap with other regions.

Figure 5:
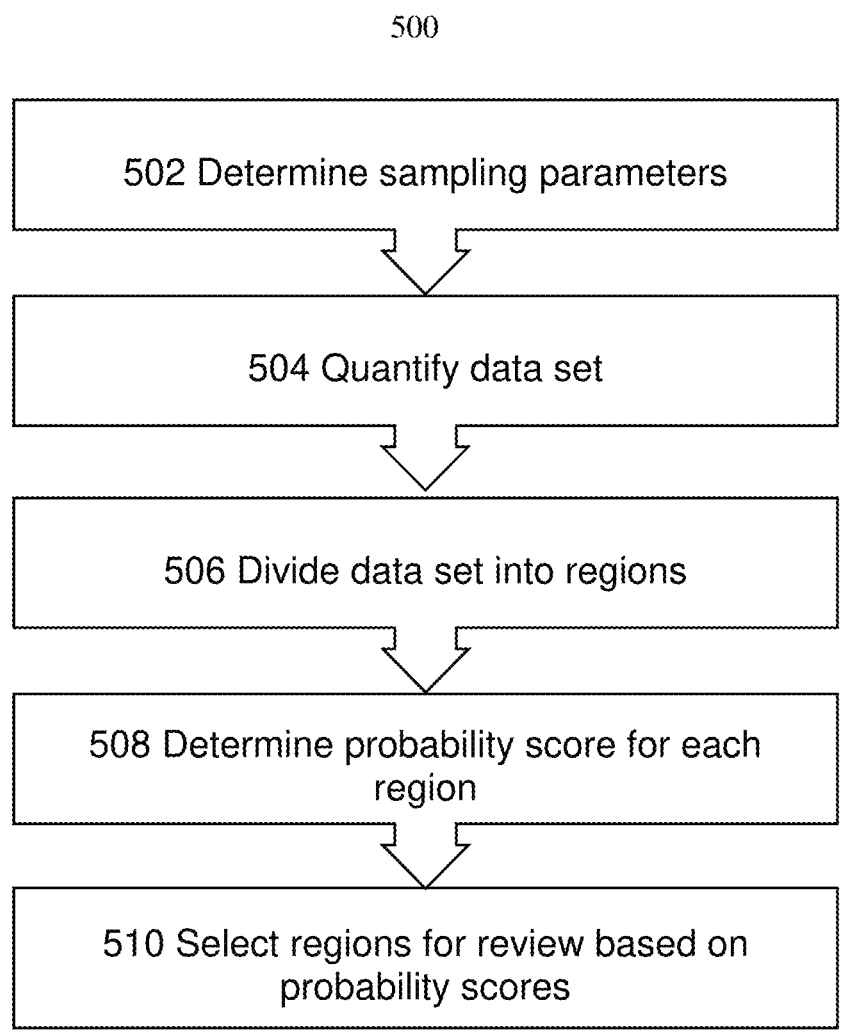
FIG. 5 illustrates a method for selecting subsets of a geospatial data set for review, according to some embodiments.

FIG. 5 illustrates a method for selecting subsets of a geospatial data set for review, according to some embodiments. The method provides for quantifying the features of the data set, such as determining a number of features in the data set and determining a number of features associated with each layer, theme, and/or attribute represented in the data set. The method further provides for determining sampling parameters. In some embodiments, the method may select regions to be statistically representative of one or more layers, themes, or attribute classes. In other embodiments, the method may select regions to be statistically representative of all features in the data set, without reference to specific feature classes, layers, themes, or attributes. Sampling parameters may correspond to the type or types of feature for which the system may select a statistically representative number of regions for review.

The data set may be divided into regions and a selection probability may be determined for each region. Regions may then be selected for review. Regions may be selected based on the selection probabilities. Regions may be selected until the sampling parameters of features in the selected region are large enough as a proportion of the sampling parameters for all features in the data set may be statistically representative of the whole data set within a confidence interval.

At step 502, sampling parameters may be determined. Sampling parameters may correspond to feature characteristics for which regions should be selected to provide a statistically representative subset. In some embodiments, regions may be selected to include a statistically representative subset of the data set based on the number of features in the data set. In other embodiments, regions may be selected to include a statistically representative subset of the data set for features in the data set having certain characteristics, such as belonging to a certain feature class. For example, a group of regions may be selected that includes a statistically representative subset of polygon features based on the amount of polygon features in the whole data set. Sampling parameters may correspond to feature characteristics for which a statistically representative set of regions may be selected. In some embodiments, sampling parameters may be determined based on an input from a user. In other embodiments, sampling parameters may be determined based on a default selection, or based on a sampling parameter file.

Regions may also be selected to provide a statistically representative subset of features based on a size of linear and/or polygonal features, rather than a number of such features. For example, in some embodiments, regions may be selected until the length of linear features within the selected regions comprises a statistically representative subset of the length of all linear features in the data set, rather than the number of linear features in the selected regions. For example, a selected region may include only one linear feature, but the feature may comprise 90% of the total length of all linear features in the data set. Thus, sampling parameters may correspond to the number of point features, linear features, and polygonal features to be included in selected regions, and may also correspond to the size of linear and polygonal features included in selected regions.

Sampling parameters may be based on any type of feature characteristic. The sampling can be based on all features, a subset of features, feature classes, features with certain attributes (e.g. schools), or other characteristic.

FIG. 6 shows a sampling parameter selection interface 600, according to some embodiments. The interface may include one or more inputs 602, such as check boxes, radio buttons, drop down menus, or other inputs, corresponding to one or more sampling parameters 604. Each sampling parameter may correspond to a feature characteristic. For example, in the embodiment of FIG. 6, Total_COUNTS, Total_LENGTH, and Total_AREA sampling parameters are selected. Total_COUNTS may correspond to the raw number of features in the data set. Total_LENGTH may correspond to the total length of all linear features in the data set. And Total_AREA may correspond to the total area of all polygon features in the data set. Thus, a region selection performed based on the sampling parameter selection of FIG. 5 may include a statistical representative subset of the total number of features in the data set, a statistically representative subset of all linear features in the data set based on length, and a statistically representative subset of all polygon features in the data set based on area.

Returning to the method of FIG. 5, at step 504, the data set may be quantified. In order to select regions that are statistically representative of the whole data set, metrics may be determined for the data set. For example, the total number of features, the total number of features for each theme (feature class), the total number of features for each attribute, and/or the total number of features for each geometric layer may be determined. Additionally, the number of feature themes associated with each geometric layer and/or the number of feature attributes associated with each geometric layer may be determined. The total number of point features, the total length of all linear features in the data set may be determined, and/or the total area of all polygonal features in the data set may be determined. Additionally, the number and/or amount of features in the data set corresponding to the selected sampling parameters may be determined.

At step 506, the data set may be divided into regions. Each region may correspond to a region in a geospatial data set. A region may be of any shape.

In some embodiments, a grid may be generated that divides the geographic area represented by the data set into a plurality of regions. For example, the data set may be divided into a plurality of 1 kilometer by 1 kilometer regions. In some embodiments, each region may have the same shape and size. In other embodiments, one or more regions may have a different shape and/or size than one or more other regions. In some embodiments, the regions may be rectangular. In other embodiments, the regions may be square.

In some embodiments, the geographic area to which one or more regions correspond may have a length of 1 meter or less, 100 meters or less, 1 km or less, 10 km or less, 100 km or less, or 1,000 km or less. In other embodiments, the geographic area to which one or more regions correspond may have a length of 1 meter or more, 100 meters or more, 1 km or more, 10 km or more, 100 km or more, or 1,000 km or more. In some embodiments, the geographic area to which one or more regions correspond may have a width of less than 1 meter, less than 100 meters, less than 1 km, less than 10 km, less than 100 km, or less than 1,000. In other embodiments, the geographic area to which one or more regions correspond may have a width of greater than 1 meter, greater than 100 meters, greater than 1 km, greater than 10 km, greater than 100 km, or greater than 1,000 km.

In some embodiments, the geographic area to which one or more regions correspond may have an area of 1 square meter or less, 100 square meters or less, 1 square km or less, 10 square km or less, 100 square km or less, or 1,000 square km or less. In other embodiments, the geographic area to which one or more regions correspond may have an area of 1 square meter or more, 100 square meters or more, 1 square km or more, 10 square km or more, 100 square km or more, or 1,000 square km or more.

In some embodiments, one or more regions may overlap with one or more other regions. In other embodiments, no region may overlap with any other region.

In some embodiments, the size and/or shape of one or more regions may be determined based on an input from a user. In other embodiments, the size and/or of one or more regions may be determined based on a default value or a value stored in a file.

In some embodiments, the size and/or shape of one or more regions may be determined based on the size of the geographic area represented by the data set. In some embodiments, the shape and/or size of one or more regions may be determined based on a number of features in the data set or a number of features in the data set relative to the geographic area represented by the data set. For example, a data set with a higher feature density may be divided into smaller regions than a data set with a lower feature density.

In some embodiments, the shape and/or size of one or more regions may be determined based on one or more intended uses of the data set.

At step 508, a probability score may be determined for each region. A probability score may correspond to a probability of a region being selected for review.

Figure 7:
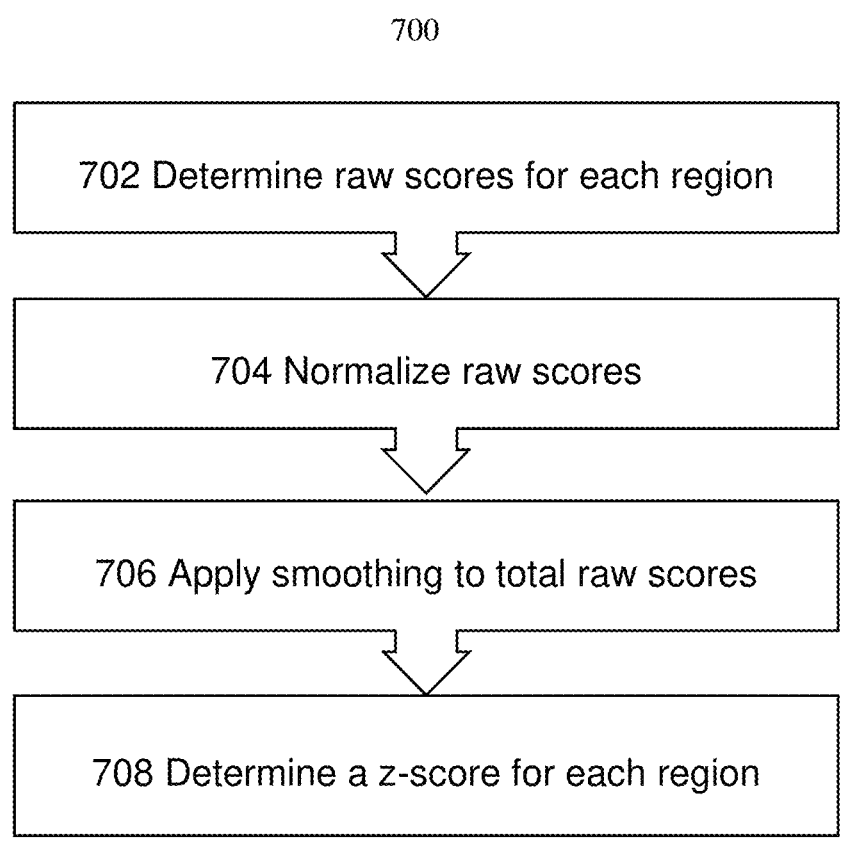
FIG. 7 illustrates a method for determining probability scores of regions of a geospatial data set, according to some embodiments.

FIG. 7 illustrates a method 700 for determining probability scores of regions of a geospatial data set, according to some embodiments.

At step 702, one or more raw scores may be determined for each region. In some embodiments, one or more raw scores may be generated for each region based on one or more sampling parameters, such as determined with at step 502 above. The number of raw scores determined for each region may correspond to a number of sampling parameters. For example, a raw score may correspond to a total number of features in a region, a total number of features for each theme (feature class) in a region, a total number of features for each attribute in a region, and/or a total number of features for each geometric layer may in a region. Additionally, a raw score may correspond to a number of feature themes associated with each geometric layer in a region and/or a number of feature attributes associated with each geometric layer. A raw score may correspond to a total number of point features in a region, a total length of all linear features in a region, and/or a total area of all polygonal features in the region.

At step 704, raw scores may be normalized. In some embodiments, a raw score may be normalized proportionally by dividing the raw score by the value of the corresponding sampling parameter for the whole data set. For example, for a raw score that corresponds to a length of all linear features in a region, the raw score may be normalized by dividing the raw score by the length of all linear features in the whole data set.

In other embodiments, a raw score may be normalized based on percentile ranking relative to other regions. For example, for a raw score that corresponds to a number of building features in a region, the raw score may be normalized by determining a percentage of regions that include fewer building features than the region to which the raw score corresponds.

In some embodiments, a total raw score for each region may be determined by adding together the normalized scores associated with a region determined for the region and dividing by the number of normalized scores determined for the region.

At step 706, the total raw scores may be smoothed. In some embodiments, Bayesian smoothing may be applied to the total raw scores. Smoothing may compensate for arbitrary division of the data set into regions, such as by grid lines, at step 506.

The smoothed score of a region may be determined by the following equation:

$$PR_i = \beta_i * \Sigma\left(\frac{x_i}{n_i}\right) + (1 - \beta_i) * \frac{x_i}{n_i},$$

where $PR_i$ is the smoothed score of a region, $\beta_i$ is a shrinkage score, $$\Sigma\left(\frac{x_i}{n_i}\right)$$

is the mean of total raw score for all regions, $$\frac{x_i}{n_i}$$

is a local score estimate corresponding to the average raw score among adjacent regions, and $\beta_i$ is a shrinkage factor complement, and $$\beta_i = \frac{\sigma_i^2}{\sigma_i^2 + \tau_i^2},$$

where $\sigma_i^2$ is a local variance estimate and $\tau_i^2$ is a global variance estimate.

At step 708, a z-score may be determined for each region. The z-score of a region may correspond to the probability score of the region. A z-score may correspond to the number of standard deviations the smoothed score of a region is from the mean of the smoothed scores for all regions.

Returning to the method of FIG. 5, at step 510, regions may be selected for review based on probability scores. A region may be selected based on the probability scores of the regions. The probability score of a region may correspond to a probability of the region being selected. In some embodiments, a region may be selected based on a weighted random selection, where the weights correspond to the probability scores of each region.

A minimum sample size may be determined based on the size of the data set, an allowable error rate indicated by one or more target quality scores, and/or confidence interval. To determine whether selected regions comprise a minimum sample size, an amount of features in a selected region corresponding to the selected sampling parameters may be determined. If the amount of features in all selected regions corresponding to the selected sampling parameters for the selected regions is greater than or equal to a threshold value, then sampling may be complete. If the number of features corresponding to the selected sampling parameters for the selected regions is less than a threshold value, an additional region may be selected. Additional regions may be selected until the amount of features corresponding to the selected sampling parameters for the selected regions is greater than or equal to a threshold value.

Figure 8:
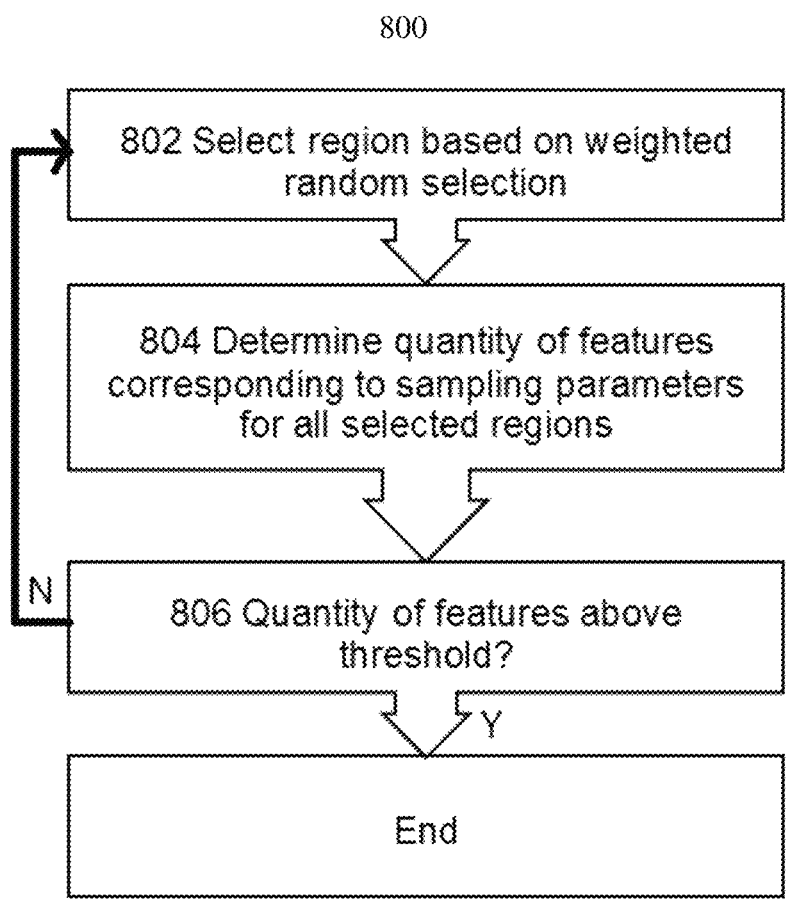
FIG. 8 illustrates a method for selecting regions of a geospatial data set for review, according to some embodiments.

FIG. 8 illustrates a method 800 for selecting regions of a geospatial data set for review, according to some embodiments. At step 802, a region may be selected based on based on the probability scores of the regions.

At step 804, a quantity of features corresponding to the sampling parameters in all selected regions may be determined. As explained above, the quantity may be based on a number of features included in selected regions, or may be based on the size of linear and/or polygonal features in the selected regions as a proportion of the whole data set.

At step 806, a determination may be made whether the quantity of features corresponding to the sampling parameters in all selected regions is less than a threshold value. If the number of features is less than a threshold value, then the method may return to step 802, and an additional region may be selected. If the number of features is greater than or equal to a threshold value, then no additional regions may be selected. After regions have been selected, information corresponding to the selected regions may be generated and stored, such as in storage 140, for future reference. For example, information indicating which regions were selected, the probability score of selected regions, the number and type of features in selected regions, and/or other information may be stored.

In some embodiments, the threshold value may correspond to a minimum number of features (or size of features, for sampling parameters corresponding to length and area) corresponding to the sampling parameters included in the selected regions such that the selected regions include a statistically representative sample of all features corresponding to the sampling parameters for the whole data set within a confidence interval based on an allowable error rate corresponding to a target quality score. In some embodiments, the confidence interval may be determined based on a user input. In other embodiments, the confidence interval may be determined based on a default value or from a data file.

In some embodiments, the threshold value may be based on a proportion of the total number of features in the data set corresponding to the sampling parameters. For example, additional regions may be selected until the selected regions include at least 5% of all features in the data set corresponding to the sampling parameters, at least 10% of all features in the data set corresponding to the sampling parameters, at least 12% of all features in the data set corresponding to the sampling parameters, at least 15% of all features in the data set corresponding to the sampling parameters, or other proportion. In some embodiments, regions may be selected until 12% of features corresponding to the sampling parameters are included in the selected regions or, for linear and/or polygonal features, regions may be selected until 12% of the length and/or area of all linear and/or polygonal features is included in the selected regions. In some embodiments, the proportion may be determined based on a user input. In other embodiments, the proportion may be determined based on a default value or a data file.

Figure 9:
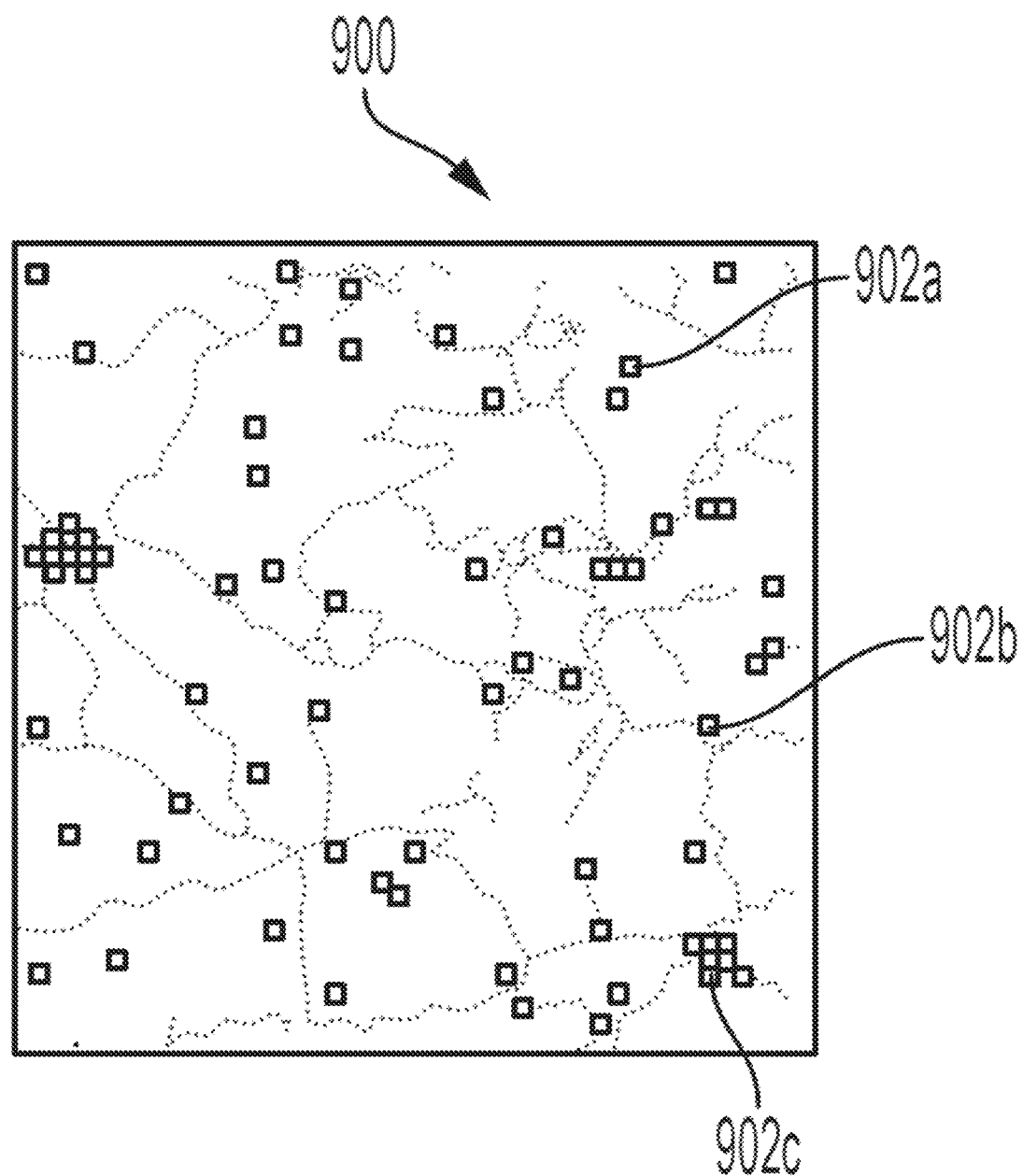
FIG. 9 shows a set of selected regions of a geospatial data set, according to some embodiments.

FIG. 9 shows a set of review areas of a geospatial data set, according to some embodiments. FIG. 9 includes a map 900 and a plurality of review areas 902a-902c. Review areas may correspond to regions of a geospatial data set selected for review, such as at step 510, above. In some embodiments, selected review areas may be clustered in certain areas of the data set. Clusters of selected regions may correspond to areas of the data set with a high density of relevant features based on sampling parameters, and thus regions with high probability scores.

Returning to the method of FIG. 2, at step 206 a second data set may be generated based on selected regions. In some embodiments, the second data set may be a geospatial data set. In some embodiments, the second data set may comprise one or more polygons representing one or more selected regions. In other embodiments, the second data set may include selected regions of the first geospatial data set. The second data set may be stored as a data file in memory, such as in storage 140.

The selected regions in the second data set may be evaluated for errors, such as errors of omission, commission, thematic accuracy, positional accuracy, attribute accuracy and/or other type of error. In some embodiments, the second data set may be provided to a user for evaluation. Alternatively, the second data set may be used as an input to a machine learning algorithm that may perform automated evaluation of the selected regions. Because regions provided for review represent only a subset of the whole data set and include a subset of features, variation between different reviewers may be reduced because different reviewers are more likely to identify the same errors.

Review may be performed by comparing the selected regions to imagery corresponding to the geographic area represented by the data set. During review, errors—or "calls"—may be generated and stored in the second data set. Calls may correspond to any type of error, such as errors of omission, commission, thematic accuracy, positional accuracy, attribute accuracy, and/or other type of error. Additional information associated with a call may also be generated and stored, such as the feature class to which the error corresponds, the geometry of the feature to which the error corresponds, a description of the error, the identity of a review that identified the error, the time the error was identified, or other information.

Selected regions may be reviewed on a geospatial data quality assessment system 100, such as described with respect to FIG. 1, above. Review may be performed on the same system on which regions were selected for review, or may be performed on a separate system and/or in a different location. Additionally, review may be performed by a different user than a user that configured the system. Delegating review to a different user may facilitate more objective review.

The system may generate and store additional information based on the review. For example, the system may generate and store information corresponding to the identity of the reviewer, the time of review, the duration of review, the duration of review of each selected region, and/or other metadata generated during review. In some embodiments, information stored during review may be stored in a file that stores a portion of the second data set. In other embodiments, information stored during review may be stored in a file separate from the second data set.

At step 208, the second data set may be received, such as after review is complete. The reviewed data set may include one or more errors identified during review.

At step 210, quality scores may be determined based on the reviewed regions. A quality score may correspond to an expected error rate for the whole data set based on an error rate of the selected regions, within a confidence interval.

A quality score may be determined based on all features in the data set. Additionally or alternatively, in some embodiments, one or more quality scores may be generated based on each sampling parameter, each feature class, each feature attribute, each feature geometry, and/or other feature characteristics.

One or more quality scores may also be determined based on each feature class category, such as determined at step 204. For example, a first quality score may be determined based on feature classes categorized as "essential." A second quality score may be determined based on feature classes categorized as "important."

In some embodiments, a quality score may be determined based on a lot tolerance percent defective (LTPD) statistical sampling technique. For example, the lot size may correspond to the total amount of features in the data set corresponding to a sampling parameter. For example, for a sampling parameter based on the length of all linear features in the data set, the lot size may correspond to the length of all linear features in the data set. For a sampling parameter based on the number of features corresponding to a feature class, the lot size may be the number of features in the data set corresponding to the feature class. The sample size may correspond to an amount of features in the regions selected for review corresponding to the sampling parameters, and the number of errors may be the number of calls dropped in the selected regions during review.

At step 212, one or more outputs may be generated, stored, and/or displayed.

In some embodiments, the system may generate a data file as an output. The data file may include information corresponding to the data quality assessment. For example, the data file may include one or more quality scores, one or more target quality scores, one or more lists of errors identified during review, one or more items indicating whether a quality score is greater than or less than a corresponding target score, and/or other information.

The data file may also include a list of feature class categories for which a quality score is greater than or equal to a corresponding target score ("pass"), and/or a list of feature class categories for which a quality score is less than a corresponding target score ("fail"). Similarly, a data file may include a list of use cases for which one or more quality scores were greater than or equal to one or more target quality scores and/or a list of use cases for which one or more quality scores were less than one or more target quality scores.

The data file may also include information regarding the review of the selected regions. For example, the data file may include a list of errors identified during review and corresponding information, such as error type, location, and/or information regarding the corresponding feature, such as feature class, attribute, or other characteristic, or other information. The data file may also indicate an identity of the reviewer, a total time spent reviewing, a time spent reviewing each selected region, whether the reviewer visited each selected region, or other information. The data file may include a number of errors corresponding to one or more feature classes and/or one or more feature class categories.

Figure 10:
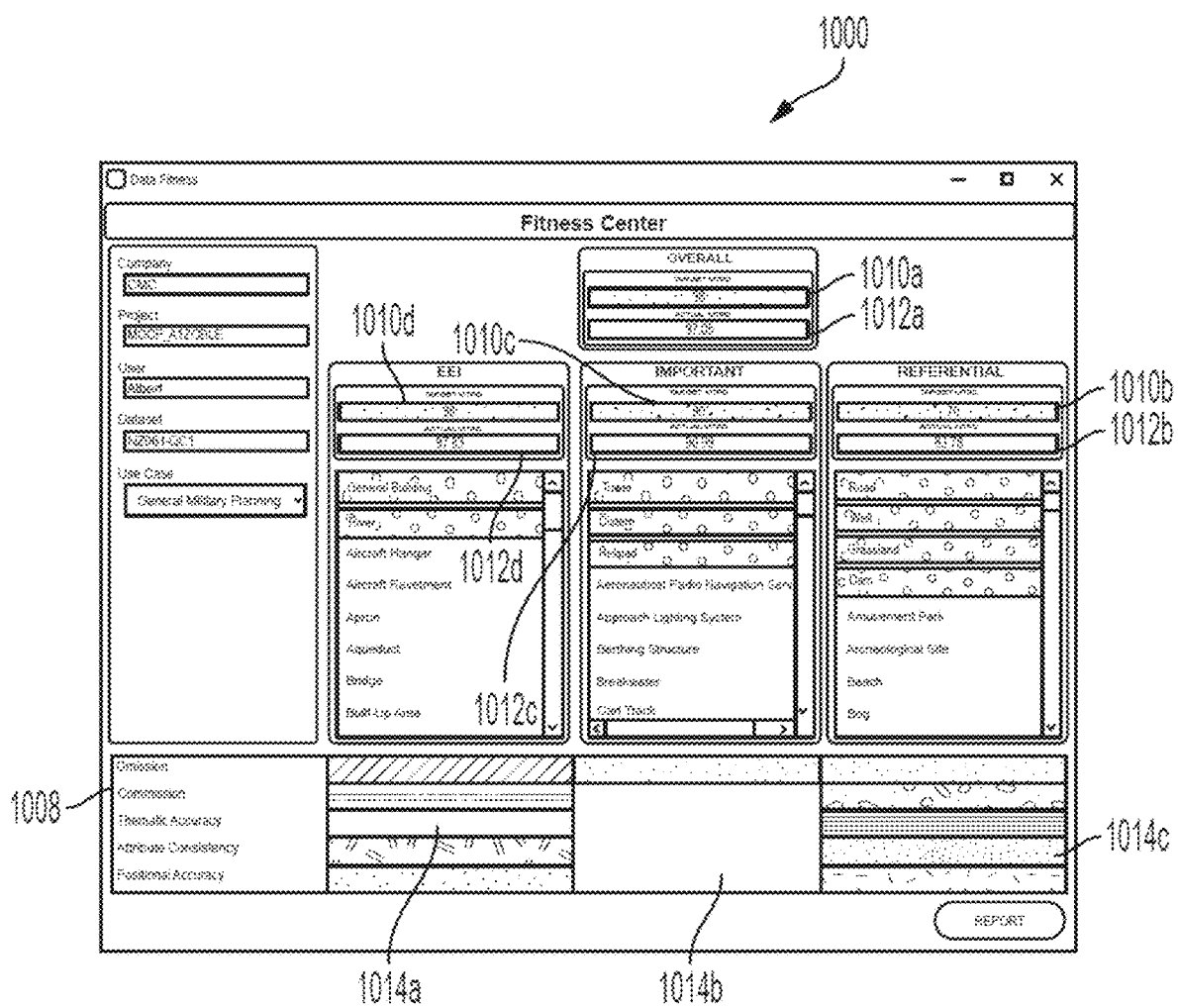
FIG. 10 shows a geospatial data evaluation interface, according to some embodiments.

The system may also display an output based on the assessment. FIG. 10 shows a geospatial data evaluation interface 1000, according to some embodiments. The interface may correspond to the assessment configuration interface described with respect to FIG. 4.

Based on one or more quality scores and/or one or more target quality scores, the interface may indicate whether a data set is suitable for an intended purpose or whether a data set is not suitable for an intended purpose. For example, based on one or more quality scores and/or one or more target quality scores, the system may indicate that a data set is not suitable for an intended purpose if one or more quality scores are below a corresponding target quality score.

The evaluation interface may be updated based on the results of the assessment. For example, in the evaluation interface, quality scores may be populated in actual score fields 1012*a*-1012*d* based on the assessment. In some embodiments, one or more actual score fields may be designated as a "Map Tolerance Percent Defect," or "MTPD" value. Based on the assessment, target score fields 1010*a*-1010*d* may be updated based on whether an actual score is greater than or equal to a corresponding target score. For example, if an actual score is greater than or equal to an associated target score, the target score field may display as a first color. If an actual score is less than an associated target score, the target score field may display as a second color.

In some embodiments, the interface may display an amount of errors associated with each feature class. In some embodiments, the amount of errors displayed for a feature class may correspond to an amount of errors associated with the feature class identified during review of the data set. In other embodiments, the amount of errors displayed for a feature class may correspond to a projected amount of errors associated with the feature class for the whole data set based on an amount of errors associated with the feature class identified during review of the data set.

The evaluation interface may also include an error type field 1008. The error type field may comprise a grid comprising a plurality of cells 1014*a*-1014*c*, each cell in the grid corresponding an error type and a feature class category. One or more cells may be displayed as a color corresponding to the expected error rate for the data set based on the error type and criteria category to which the cell responds. For example, if an error rate for a feature class category for an error type is greater than or equal to a target error rate, the corresponding cell may be displayed as red. The cells may be displayed as different colors or different shades of a color depending on the amount by which an error rate exceeds a target error rate. In this way, the output may visually indicate which error types contribute most to an error rate of the feature class category and/or the data set as a whole. In some embodiments, an error rate may equal the difference between 100 and a corresponding quality score.

The displayed results may be updated in response to a user moving one or more feature classes between categories. For example, in response to a user moving a feature class having a high error rate from a first category to a second category, the actual score corresponding to the first category may be updated based on the remaining feature classes in the category. A user may move multiple feature classes between categories simultaneously by selecting multiple feature classes and moving the selected feature classes between categories. Feature classes may also be moved between categories in response to an updated use case selection. In response to a user selecting a use case, the interface may sort feature classes into categories based on a predefined configuration and update one or more quality scores associated with one or more feature class categories.

By updating quality scores in response to changes in feature class categorization, the interface may allow a user to determine how one or more features classes affect the quality of a feature class category. By reducing the level of importance associated with one or more feature classes, the quality score of a higher importance feature class category may increase to an acceptable level.

Based on one or more quality scores, a user may correct the data set to improve the quality of the data set, such as by correcting errors identified during review. Information regarding each correction, such as the error type, feature class, location, or other information, may be generated and stored, such as in storage 140. After a data set has been corrected, the data set may be reevaluated to determine one or more updated quality scores.

Based on one or more quality scores, a user may determine that a data set is suitable for an intended purpose. Alternatively, a user may determine that a data set is not suitable for an intended purpose and/or that the data set requires corrections.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims. In the foregoing description of the disclosure and embodiments, reference is made to the accompanying drawings, in which are shown, by way of illustration, specific embodiments that can be practiced. It is to be understood that other embodiments and examples can be practiced, and changes can be made without departing from the scope of the present disclosure.

Although the foregoing description uses terms first, second, etc. to describe various elements, these elements should not be limited by the terms. These terms are only used to distinguish one element from another. In addition, it is also to be understood that the singular forms "a," "an," and "the" used in the foregoing description are intended to include the plural forms as well, unless the context clearly indicates otherwise. It is also to be understood that the term "and/or" as used herein refers to and encompasses any and all possible combinations of one or more of the associated listed items. It is further to be understood that the terms "includes, "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The present disclosure also relates to a device for performing the operations herein. This device may be specially constructed for the required purposes, or it may include a general purpose computer selectively activated or reconfigured by a computer program stored in the computer. Such a computer program may be stored in a non-transitory, computer readable storage medium, such as, but not limited to, any type of disk, including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referenced in this disclosure may include a single processor or may be architectures employing multiple processor designs for increased computing capability.

The methods, devices, and systems described herein are not inherently related to any particular computer or other apparatus. Various general-purpose systems may also be used with programs in accordance with the teachings herein, or it may prove convenient to construct a more specialized apparatus to perform the required method steps. The required structure for a variety of these systems will appear from the description below. In addition, the present disclosure is not described with reference to any particular programming language. It will be appreciated that a variety of programming languages may be used to implement the teachings of the present disclosure as described herein.

The invention claimed is:

1. A method for identifying geospatial data for quality review, comprising:
receiving a geospatial data set representing a geographic area, wherein the geospatial data set comprises data representing a plurality of map features, and wherein the plurality of map features is associated with one or more feature classes;
determining a value for map features in the geospatial data set; and selecting one or more regions in the geospatial data set for review, wherein selecting one or more regions in the geospatial data set for review comprises:
dividing the geospatial data set into a plurality of regions;
determining a value for map features in each region;
determining a probability score for each region based on the value for map features in the region and the value for features in the geospatial data set; and
selecting one or more regions for review based on the probability scores, wherein a number of selected regions is based on a value for map features in the one or more selected regions reaching a threshold value.

2. The method of claim 1, comprising identifying one or more feature class categories, wherein a feature class category comprises one or more feature classes of interest.

3. The method of claim 1, comprising outputting one or more review areas, wherein the one or more review areas comprise data representing the selected regions.

4. The method of claim 3, comprising evaluating the one or more review areas, wherein evaluating the one or more review areas comprises identifying one or more errors in the selected regions.

5. The method of claim 4, wherein evaluating the one or more review areas comprises storing error information associated with an identified error.

6. The method of claim 5, wherein error information comprises a feature class of the identified error.

7. The method of claim 5, wherein error information comprises a description of the identified error.

8. The method of claim 5, wherein error information comprises a location of the identified error.

9. The method of claim 4, wherein evaluating the one or more review areas comprises storing evaluation information associated with an evaluation.

10. The method of claim 9, wherein evaluation information comprises an identity of a reviewer.

11. The method of claim 9, wherein evaluation information comprises an amount time spent reviewing the data for review.

12. The method of claim 9, wherein evaluation information comprises an amount of time spent reviewing a selected region.

13. The method of claim 4, comprising receiving one or more evaluated review areas, wherein the one or more evaluated review areas comprise one or more identified errors in the selected regions.

14. The method of claim 13, comprising determining a quality score for the geospatial data set based on the reviewed data.

15. The method of claim 14, comprising receiving a target quality score for the geospatial data set.

16. The method of claim 15, comprising:
in accordance with a determination that the quality score is greater than or equal to the target quality score, indicating that the quality score is greater than or equal to the target quality score; and
in accordance with a determination that the quality score is less than the target quality score; indicating that the quality score is less than the target quality score.

17. The method of claim 13, comprising determining a quality score for the one or more feature class categories.

18. The method of claim 1, wherein determining a probability score for a region comprises determining a z-score of the region based on the value for map features in each region.

19. The method of claim 1, wherein selecting one or more regions for review based on the probability scores is based on a weighted random selection, wherein the weighted random selection is based on the probability scores of the regions.

20. The method of claim 1, wherein determining a quality score is based on a value for map features in the one or more selected regions, the value for map features in the geospatial data set, and a quantity of errors associated with one or more map features in the selected regions.

21. The method of claim 3, wherein outputting one or more review areas comprises generating a second data set, wherein the second data set comprises data corresponding to the one or more selected regions.

22. The method of claim 1, wherein the method is at an electronic device.

23. An electronic system, comprising:
one or more processors;
one or more memories; and
one or more programs, wherein the one or more programs are stored in the one or more memories and configured to be executed by the one or more processors, the one or more programs including instructions for:
receiving a geospatial data set representing a geographic area, wherein the geospatial data set comprises data representing a plurality of map features, and wherein the plurality of map features is associated with one or more feature classes;
determining a value for map features in the geospatial data set; and
selecting one or more regions in the geospatial data set for review, wherein selecting one or more regions in the geospatial data set for review comprises:
dividing the geospatial data set into a plurality of regions;
determining a value for map features in each region;
determining a probability score for each region based on the value for map features in the region and the value for map features in the geospatial data set; and
selecting one or more regions for review based on the probability scores, wherein a number of selected regions is based on a value for map features in the one or more selected regions reaching a threshold value.

24. The system of claim 23, wherein a user provides the geospatial data set from a client computer.

25. The system of claim 24, wherein the system is located remotely from the client computer.

26. A non-transitory computer readable storage medium storing one or more programs, the one or more programs comprising instructions, which when executed by an electronic system, cause the system to:
receive a geospatial data set representing a geographic area, wherein the geospatial data set comprises data representing a plurality of map features, and wherein the plurality of map features is associated with one or more feature classes;
determine a value for map features in the geospatial data set; and
select one or more regions in the geospatial data set for review, wherein selecting one or more regions in the geospatial data set for review comprises:
dividing the geospatial data set into a plurality of regions;
determining a value for map features in each region;

determining a probability score for each region based on the value for map features in the region and the value for map features in the geospatial data set; and selecting one or more regions for review based on the probability scores, wherein a number of selected regions is based on a value for map features in the one or more selected regions reaching a threshold value.

* * * * *